US011549295B2

(12) United States Patent  
Davis et al.

(10) Patent No.: US 11,549,295 B2  
(45) Date of Patent: Jan. 10, 2023

(54) CABINET AND METHOD FOR MAKING THE SAME, AND AIRCRAFT INCLUDING A CABINET

(71) Applicant: Gulfstream Aerospace Corporation, Savannah, GA (US)

(72) Inventors: Timothy Allen Davis, Savannah, GA (US); Timothy O'Hara, Savannah, GA (US)

(73) Assignee: Gulfstream Aerospace Corporation

( * ) Notice: Subject to any disclaimer, the term of this patent is extended or adjusted under 35 U.S.C. 154(b) by 708 days.

(21) Appl. No.: 16/554,178

(22) Filed: Aug. 28, 2019

(65) Prior Publication Data

US 2021/0062563 A1    Mar. 4, 2021

(51) Int. Cl.
*E05D 15/56* (2006.01)
*B64D 11/00* (2006.01)
*E05D 13/00* (2006.01)
*E05F 3/22* (2006.01)

(52) U.S. Cl.
CPC ............ *E05D 15/56* (2013.01); *B64D 11/003* (2013.01); *E05D 13/003* (2013.01); *E05F 3/224* (2013.01); *E05Y 2400/61* (2013.01); *E05Y 2900/502* (2013.01)

(58) Field of Classification Search
CPC ....... E05D 15/56; E05D 15/58; E05D 15/582; E05D 13/003; B64D 11/003; B64D 11/04; B64D 11/00; E05F 3/224; E05F 1/16; E05Y 2400/61; E05Y 2900/502; E05Y 2900/538; E05Y 2201/684; E05Y 2201/482; E05Y 2201/654; E05Y 2600/46; E05Y 2800/266; A47B 46/005; A47B 81/00; E06B 5/006; E06B 3/70; Y10T 16/53834; Y10T 16/53864; Y10T 16/593; Y10T 16/5995;
(Continued)

(56) References Cited

U.S. PATENT DOCUMENTS

| 4,383,347 A * | 5/1983 | La Conte | E05F 1/1292 16/370 |
| 5,549,258 A * | 8/1996 | Hart | B64D 11/003 312/246 |

(Continued)

FOREIGN PATENT DOCUMENTS

WO    03097973 A1    11/2003

*Primary Examiner* — William L Miller
(74) *Attorney, Agent, or Firm* — LKGlobal | Lorenz & Kopf, LLP

(57) ABSTRACT

Cabinets, methods for making cabinets, and aircraft including cabinets are provided. In one example, a cabinet includes a cabinet body that at least partially surrounds a cabinet space and that defines a cabinet opening that allows access to the cabinet space. A cabinet door at least partially covers the cabinet opening when in a closed position and extends upward from a lower edge portion to an upper edge portion. The cabinet door has an outer exposed surface facing generally in a first direction away from the cabinet space when in the closed position. The cabinet door is operatively coupled to the cabinet body for opening from the closed position to an open position including the lower edge portion moving generally upward and the upper edge portion moving generally upward and towards the first direction to expose the cabinet opening.

18 Claims, 16 Drawing Sheets

(58) Field of Classification Search
CPC . Y10T 16/625; Y10T 16/544; Y10T 16/5448; Y10T 16/545
USPC ....... 16/289, 302, 72, 76, 85, 357, 361, 362; 244/118.1
See application file for complete search history.

(56) References Cited

U.S. PATENT DOCUMENTS

| | | | | |
|---|---|---|---|---|
| 5,934,615 | A * | 8/1999 | Treichler | B64D 11/003 312/266 |
| 6,234,563 | B1 * | 5/2001 | Bascou | E05D 15/40 296/146.12 |
| 6,290,175 | B1 * | 9/2001 | Hart | B64D 11/003 244/118.1 |
| 6,398,163 | B1 * | 6/2002 | Welch | B64D 11/003 244/118.1 |
| 11,293,208 | B2 * | 4/2022 | Heimbach | E05F 3/20 |
| 2001/0039762 | A1 * | 11/2001 | Giovannetti | E05F 1/1091 49/246 |
| 2005/0264144 | A1 * | 12/2005 | Verbeek | E05F 1/1091 312/323 |
| 2008/0115322 | A1 * | 5/2008 | Migli | E05F 1/1091 16/283 |
| 2008/0216289 | A1 * | 9/2008 | Salice | E05D 3/142 49/192 |
| 2009/0139055 | A1 * | 6/2009 | Salice | E05F 1/1091 16/236 |
| 2012/0012702 | A1 * | 1/2012 | Moritz | B64D 11/003 220/212 |
| 2012/0060821 | A1 * | 3/2012 | McNamee | E05D 15/46 126/197 |
| 2017/0283058 | A1 * | 10/2017 | Papke | E05D 5/04 |
| 2019/0017308 | A1 * | 1/2019 | Chadwell | B64D 11/003 |
| 2020/0040633 | A1 * | 2/2020 | Rheaume | E05F 1/1091 |
| 2020/0115942 | A1 * | 4/2020 | Damneun | E05D 15/165 |
| 2020/0370330 | A1 * | 11/2020 | Valdes | E05C 19/12 |
| 2021/0040786 | A1 * | 2/2021 | Heimbach | A47B 46/00 |
| 2021/0276714 | A1 * | 9/2021 | Dwaraganathan | E05B 47/0012 |

\* cited by examiner

CABINET AND METHOD FOR MAKING THE SAME, AND AIRCRAFT INCLUDING A CABINET

TECHNICAL FIELD

The technical field relates generally to cabinets, and more particularly, relates to cabinets including a cabinet door that opens in an upwardly biased manner to expose a cabinet storage space, methods for making such cabinets, and aircraft including such cabinets.

BACKGROUND

The commercial and/or military transportation industries, e.g., aircraft industry, motor vehicle industry, and the like, often include storage compartments for stowing items. For example, aircraft often include one or more cabinets, such as galley upper cabinets or the like, for stowing dishware, glassware, or the like. Such cabinets include a cabinet body with a storage space inside and a cabinet opening that provides access to the storage space. One or more cabinet doors may be movably disposed over the cabinet opening to prevent any stowed items from falling out and/or to provide an aesthetically pleasing outer surface that covers the storage space.

When a cabinet door is opened, for example pivoted in a downward direction to a horizontal position near the bottom of the cabinet, the door protrudes out into the interior area of the aircraft, for example into the cabin area, galley area, or the like, making it awkward for a passenger or crew member to work around the protruding door to reach into the storage space. Additionally, many aircraft include a headliner that is disposed just over the upper portion of the cabinet preventing the cabinet door from being opened vertically upward without obstruction (e.g., via contact with) from the headliner.

Accordingly, it is desirable to provide cabinets including cabinet doors that overcome one or more of the foregoing issues, methods for making such cabinets, and aircraft including such cabinets. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a cabinet, various non-limiting embodiments of an aircraft, and various non-limiting embodiments of a method for making a cabinet, are provided herein.

In a first non-limiting embodiment, the cabinet includes, but is not limited to, a cabinet body that at least partially surrounds a cabinet space and that defines a cabinet opening that allows access to the cabinet space. The cabinet further includes, but is not limited to, a cabinet door that at least partially covers the cabinet opening when in a closed position and that extends upward from a lower edge portion to an upper edge portion. The cabinet door has an outer exposed surface facing generally in a first direction away from the cabinet space when in the closed position. The cabinet door is operatively coupled to the cabinet body for opening from the closed position to an open position including the lower edge portion moving generally upward and the upper edge portion moving generally upward and towards the first direction to expose the cabinet opening.

In another non-limiting embodiment, the aircraft includes, but is not limited to, an aircraft structure having an interior. The aircraft further includes, but is not limited to, a cabinet that is disposed in the interior. The cabinet includes, but is not limited to, a cabinet body that at least partially surrounds a cabinet space and that defines a cabinet opening that allows access to the cabinet space. The cabinet further includes, but is not limited to, a cabinet door that at least partially covers the cabinet opening when in a closed position and that extends upward from a lower edge portion to an upper edge portion. The cabinet door has an outer exposed surface facing generally in a first direction towards the interior and away from the cabinet space when in the closed position. The cabinet door is operatively coupled to the cabinet body for opening from the closed position to an open position including the lower edge portion moving generally upward and the upper edge portion moving generally upward and towards the first direction to expose the cabinet opening.

In another non-limiting embodiment, the method includes, but is not limited to, obtaining a cabinet body that at least partially surrounds a cabinet space and defines a cabinet opening that allows access to the cabinet space. The method further includes, but is not limited to, obtaining a cabinet door that has an outer exposed surface and that is configured to extend upward from a lower edge portion to an upper edge portion when in a closed position. The method further includes, but is not limited to, operatively coupling the cabinet door to the cabinet body such that the cabinet door at least partially covers the cabinet opening including the outer exposed surface facing generally in a first direction away from the cabinet space when in the closed position and opens from the closed position to an open position including the lower edge portion moving generally upward and the upper edge portion moving generally upward and towards the first direction to expose the cabinet opening.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to cabinets, methods for making cabinets, and aircraft including cabinets. The exemplary embodiments taught herein provide a cabinet including a cabinet body that at least partially surrounds a cabinet space, e.g., such as for storage of items, and that defines a cabinet opening that allows access to the cabinet space. A cabinet door at least partially covers the cabinet opening when in a closed position and extends upward from a lower edge portion to an upper edge portion. The cabinet door has an outer exposed surface facing generally in a first direction opposite or otherwise away from the cabinet space when in the closed position. In one example, the first direction is towards a person standing in front of the cabinet door who is about to open the cabinet door from the closed position to gain access to the cabinet space for storing and/or removing an item(s) therefrom.

In an exemplary embodiment, the cabinet door is operatively coupled to the cabinet body, for example via a track-cam arrangement, for opening from the closed position to an open position such that the lower edge portion of the cabinet door moves generally upward while the upper edge portion of the cabinet door moves generally upward and in or otherwise towards the first direction to expose the cabinet opening. For example, in the fully open position, the lower edge portion of the cabinet door is disposed adjacent to an upper portion of the cabinet body as the cabinet door extends upwardly at an incline therefrom to the upper edge portion. As such, in an exemplary embodiment, advantageously the cabinet door in the open position is out of the way of any person standing in front of the cabinet so that the person can easily and unobstructedly reach into the cabinet space for storing and/or for removing an item(s) from the cabinet. In an exemplary embodiment, the cabinet is disposed in an interior of an aircraft that includes a headliner that is disposed over the cabinet. As such, in an exemplary embodiment, advantageously the cabinet door can be opened to the open position to extend upwardly at an incline to limit its vertical displacement so as to not contact the headliner when the person standing in front of the cabinet opens the cabinet to gain access to the cabinet space.

Figure 1:
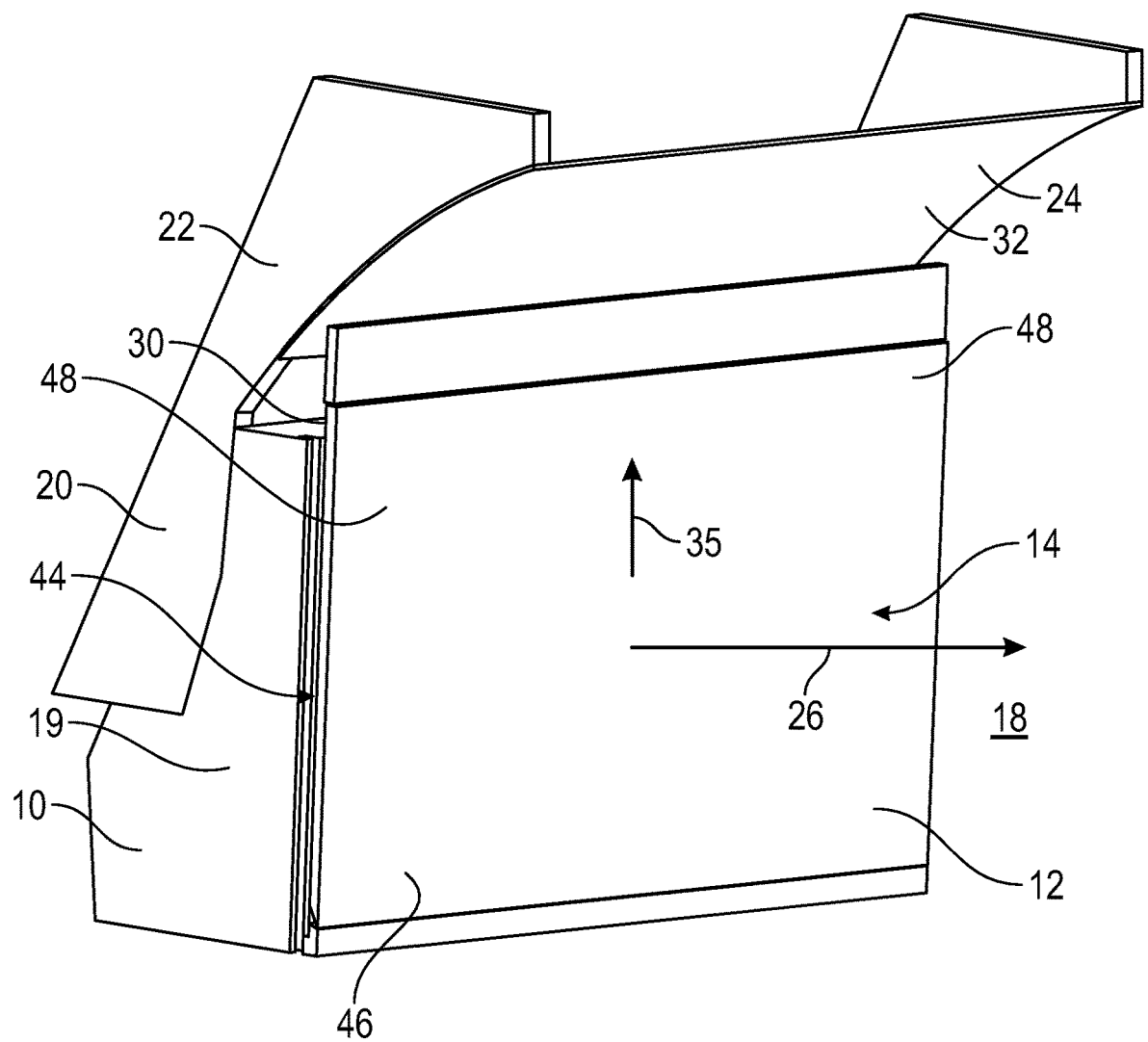
FIG. 1 illustrates a perspective view of a cabinet including a cabinet door in a closed position in accordance with an exemplary embodiment.
Figure 2:
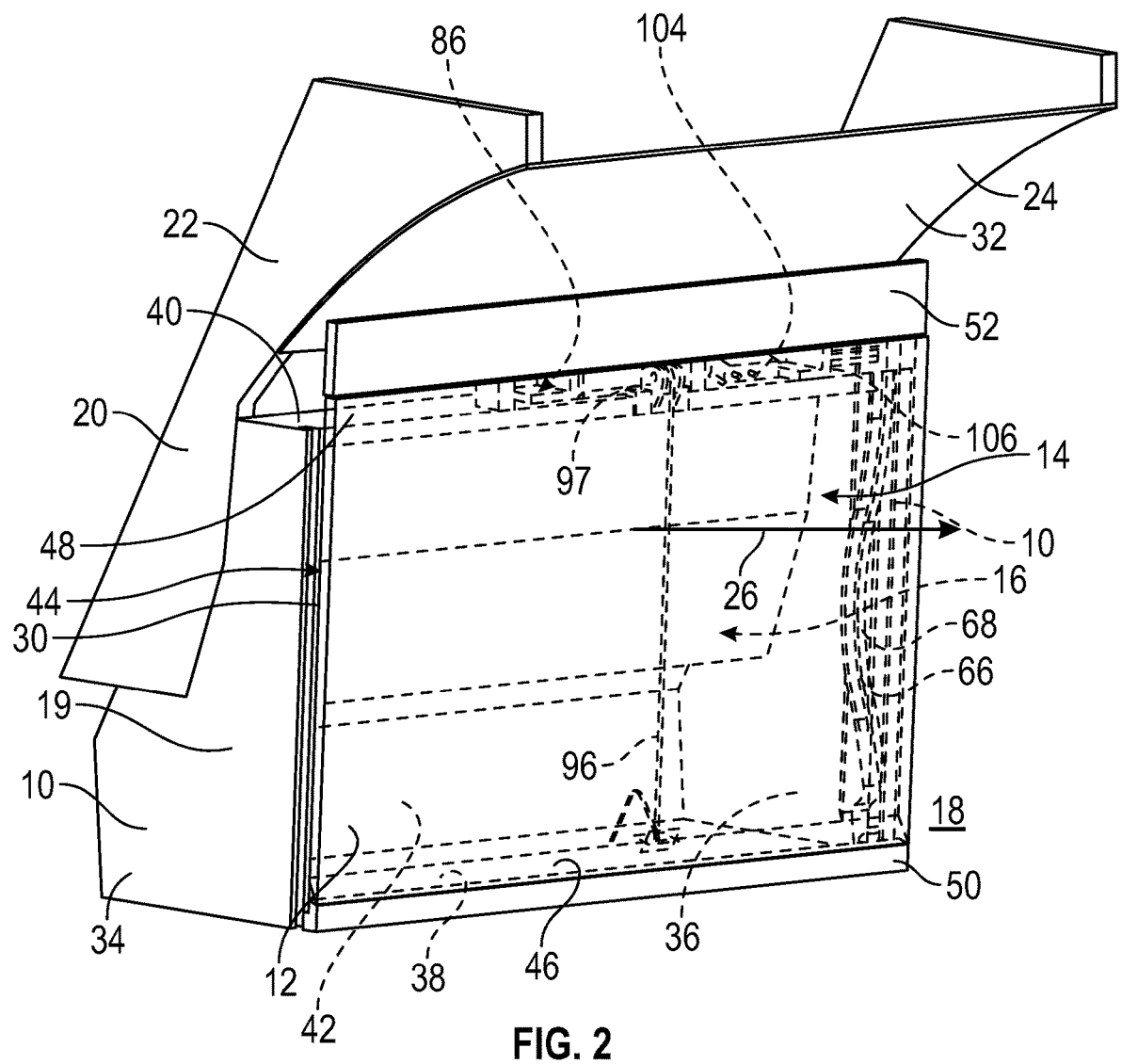
FIG. 2 illustrates a perspective view of a cabinet including a cabinet door transparently shown in a closed position to illustrate a cabinet space behind the cabinet door in accordance with an exemplary embodiment.
Figure 3:
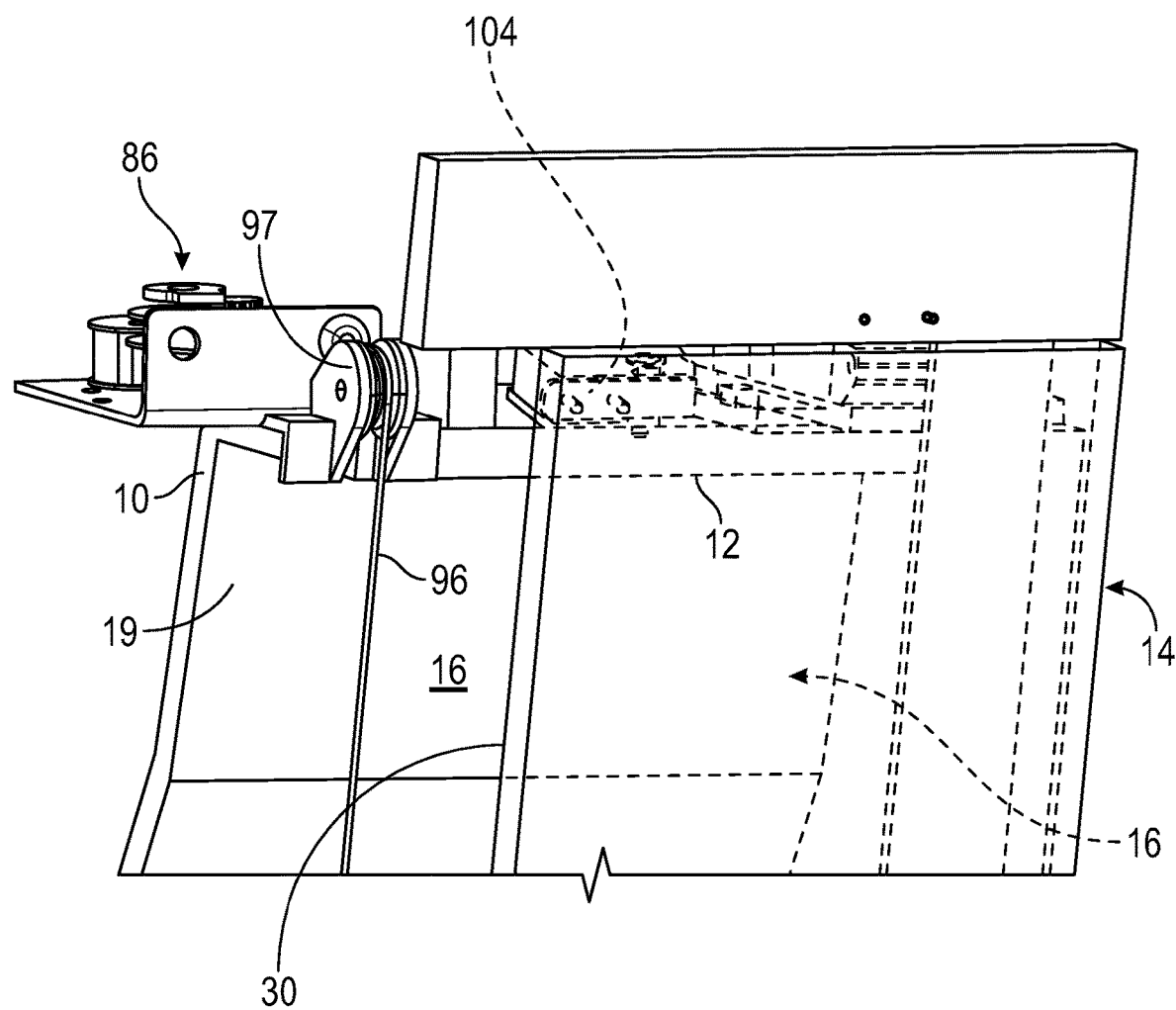
FIG. 3 illustrates a perspective view of a portion of a cabinet including a cabinet door in a closed position in accordance with an exemplary embodiment.
Figure 4:
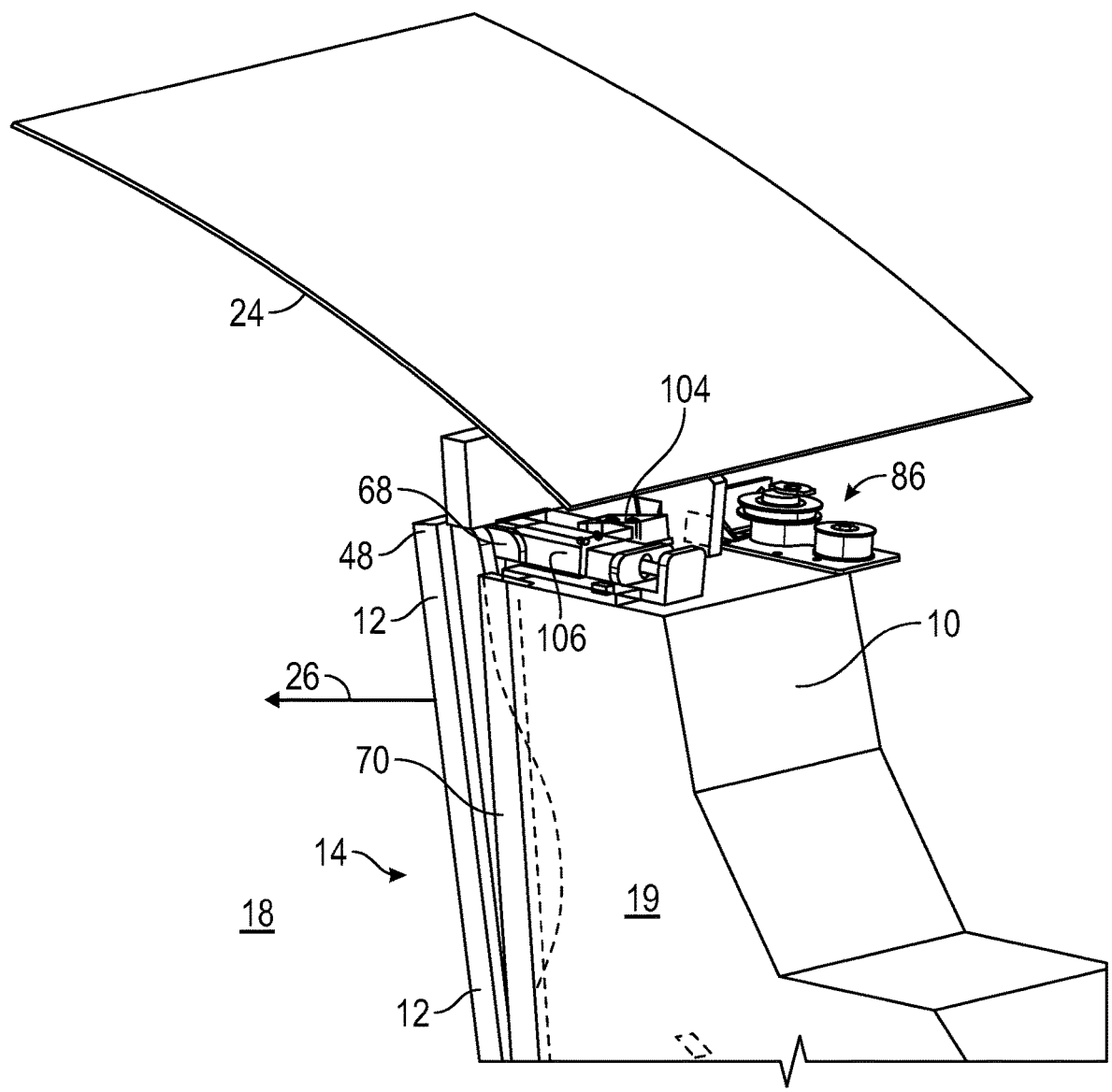
FIG. 4 illustrates a perspective rear view of a portion of a cabinet including a cabinet door in a closed position in accordance with an exemplary embodiment.

FIG. 1 illustrates a cabinet 10 including a cabinet door 12 in a closed position 14 in accordance with an exemplary embodiment. FIG. 2 illustrates the cabinet 10 in which the cabinet door 12 is transparent to show a cabinet space (indicated by single headed dashed arrow 16) that is behind the cabinet door 12. The cabinet space 16 is at least partially surrounded by a cabinet body 19. As illustrated, the cabinet 10 is arranged in an interior 18 of an aircraft structure 20 (e.g., fuselage, wall panel structure, or the like) of an aircraft 22. In an exemplary embodiment, the cabinet 10 is a galley upper cabinet and the aircraft structure 20 includes a headliner 24 that extends from relatively closely above the closed cabinet door 12 inboard towards a center region of the interior 18 of the aircraft structure 20. The cabinet door 12 has an outer exposed surface 28 that faces in a direction (indicated by single headed arrow 26) inboard towards the center region of the interior 18 when in the closed position 14 and a back side or inner surface 30 opposite the outer exposed surface 28. In an exemplary embodiment, the headliner 24 has a curved outer surface 32 that faces downward towards the interior 18 of the aircraft 22.

The cabinet body 19 includes sidewalls 34 and 36 and lower, upper and back walls 38, 40, and 42, respectively, that extend between and are coupled to the sidewalls 34 and 36 to form an open box-like structure that defines a cabinet opening 44. The cabinet opening 44 is at least partially covered (e.g., substantially fully covered) by the cabinet door 12 when in the closed position 14 and allows access to the cabinet space 16 when the cabinet door 12 is opened.

As illustrated, the cabinet door 12 extends upward (indicated by single headed arrow 35) from a lower edge portion 46 to an upper edge portion 48. Arranged below the lower edge portion 46 is a fixed footer panel 50, and a fixed closeout header panel 52 is arranged between the upper edge portion 48 of the cabinet door 12 and the headliner 24.

Referring also to FIGS. 7-15, the cabinet door 12 is operatively coupled to the cabinet body 19 for opening from the closed position 14 to an open position 54 in which the lower edge portion 46 moves generally upward 35 and the upper edge portion 48 moves generally upward 35 and in or otherwise towards the direction 26 to expose the cabinet opening 44. As used herein, the term "generally," with regard to a particular direction, for example in a vertical direction, a horizontal direction, an inboard direction, an outward direction, an upward direction, or the like, means that the modified direction closely resembles the particular direction, but may deviate slightly, such as about +/−20°, such as about +/−15°, such as about +/−10°, such as about +/−5°, for example about +/−3°, from the particular direction.

The cabinet door 12 in the fully open position 54 (shown in FIG. 15) extends upwardly at an incline (e.g., at an angle of from about 25° to 70° from horizontal) so that the upper edge portion 48 is spaced apart from the headliner 24. Further, in an exemplary embodiment, during movement of the cabinet door 12 from the closed position 14 to the fully open position 54 (shown in FIGS. 7-15), the upper edge portion 48 of the cabinet door 12 travels or otherwise moves along a curved path 56 that is proximate to and substantially matches the curved outer surface 32 of the headliner 24 such that the upper edge portion 48 remains spaced apart from the headliner 24. As such, the cabinet door 12 is moved from the closed position 14 to the fully open position 54 along the curved path 56 to limit its vertical displacement so as to not crash into the headliner 24. In an exemplary embodiment, during opening of the cabinet door 12, the lower edge portion 46 moves generally upward a total vertical distance (indicated by double headed arrow 58) and the upper edge portion 48 moves generally upward a total vertical distance (indicated by double headed arrow 60) that is less than the total vertical distance 58 when the cabinet door 12 opens from the closed position 14 to the open position 54; and, independently, the lower edge portion 46 moves in or otherwise towards the direction 26 a total horizontal distance (indicated by double headed arrow 62) and the upper edge portion 48 moves in or otherwise towards the direction 26 a total horizontal distance (indicated by double headed arrow 64) that is greater than the total horizontal distance 62 when the cabinet door 12 opens from the closed position 14 to the open position 54.

Referring to FIGS. 2 and 7-15, in an exemplary embodiment, the cabinet 10 includes a track-cam arrangement 66 that slidingly couples the cabinet door 12 to the cabinet body 19. As illustrated, the track-cam arrangement 66 includes track body portions 68 and 70 and cam elements 72 and 74 (e.g., roller bearings or the like).

The track body portion 68 is coupled to the cabinet door 12 adjacent to and/or along the inner surface 30 and includes a track 76 (e.g., groove, open channel, or the like) formed therein. In an exemplary embodiment, the track 76 includes a convex track section 78 that curves outwardly in a direction opposite the outer exposed surface 28 (e.g., towards the cabinet space 16 when in the closed position 14), and a substantially linear track section 80 that extends from the convex track section 78 towards the upper edge portion 48 (e.g., generally upward when in the closed position 14) of the cabinet door 12. The cam element 72 is coupled to an upper portion of the cabinet body 19 and is slidingly disposed in the track 76. As such, during opening of the cabinet door 12, the track 76 and the cam element 72 cooperate to guide the upper edge portion 48 of the cabinet door 12 initially generally upward as the cam element 72 advances through the substantially linear track section 80 and, subsequently, in or otherwise towards the direction 26 as the cam element 72 advances through the convex track section 78.

The track body portion 70 is coupled to the cabinet body 19 at or adjacent to the perimeter edge that defines the cabinet opening 44 and includes a track 82 (e.g., groove, open channel, or the like) formed therein. In an exemplary embodiment, the track 82 includes a substantially linear track section 84 that extends generally upward from a lower part to an upper part of the track body portion 70. The cam element 74 is coupled to or adjacent to the lower edge portion 46 of the cabinet door 12 and is slidingly disposed in the track 82. As such, during opening of the cabinet door 12, the track 82 and the cam element 74 cooperate to guide the lower edge portion 46 of the cabinet door 12 generally upward as the cam element 74 advances through the substantially linear track section 84.

The cabinet door 12 may be manually opened, or alternatively, the cabinet 10 may include one or more mechanisms that assist in opening the cabinet door 12. Referring to FIGS. 2-6 and 15, in an exemplary embodiment, the cabinet 10 includes a spring motor 86 that is coupled to the cabinet body 19 and operatively coupled to the cabinet door 12 to automatically lift or otherwise drive the cabinet door 12 from the closed position 14 to the open position 54 when the cabinet door 12 is unlatched. As illustrated, the spring motor 86 includes a drive spring reel 88, a slave reel 90, and a flat coil spring 92 that is wrapped about the drive spring reel 88. The flat coil spring 92 is operatively coupled to the slave reel 90 to rotate the slave reel 90 in a counterclockwise direction (indicated by single headed arrow 94) for opening the cabinet door 12. A cable 96 is coupled to the slave reel 90 and extends over a pulley 97 down to the cabinet door 12 where it is coupled to the back side 30 of the cabinet door 12 proximate the lower edge portion 46. As will be discussed in further detail below, when the cabinet door 12 is unlatched or otherwise released from the cabinet body 19, the drive spring reel 88 rotates the slave reel 90 in the counterclockwise direction 94 to pull the cable 96 up over the pulley 97 where it wraps around the slave reel 90 at one end while the other end of the cable 96 pulls the cabinet door 12 from the closed position 14 to the open position 54.

In an exemplary embodiment, the cabinet 10 includes a damper gear 98 that is coupled to the slave reel 90 of the spring motor 86. A damper 100 (e.g., rotational damper or the like) that is coupled to a bracket 102, which is mounted on the upper portion of the cabinet body 19, meshes with the damper gear 98 to slow or otherwise control the winding speed of the cable 96 as it winds around the slave reel 90 during opening to dampen movement of the cabinet door 12.

In an exemplary embodiment, the cabinet 10 includes a latch 104 that is coupled to the upper portion of the cabinet body 19 and that engages or is otherwise selectively coupled to the cabinet door 12 proximate to the upper edge portion 48 to hold the cabinet door 12 in the closed position 14. To release the cabinet door 12 from the closed position 14, a passenger or other occupant, for example, of the aircraft 22, manually pushes against the upper edge portion 48 of the cabinet door 12 to actuate the latch 104 to release the cabinet door 12 from the closed position 14. When released, the upper edge portion 48 of cabinet door 12 moves slightly inboard in the direction 26 towards the interior 18 of the aircraft 22 has shown in FIG. 8.

Figure 5:
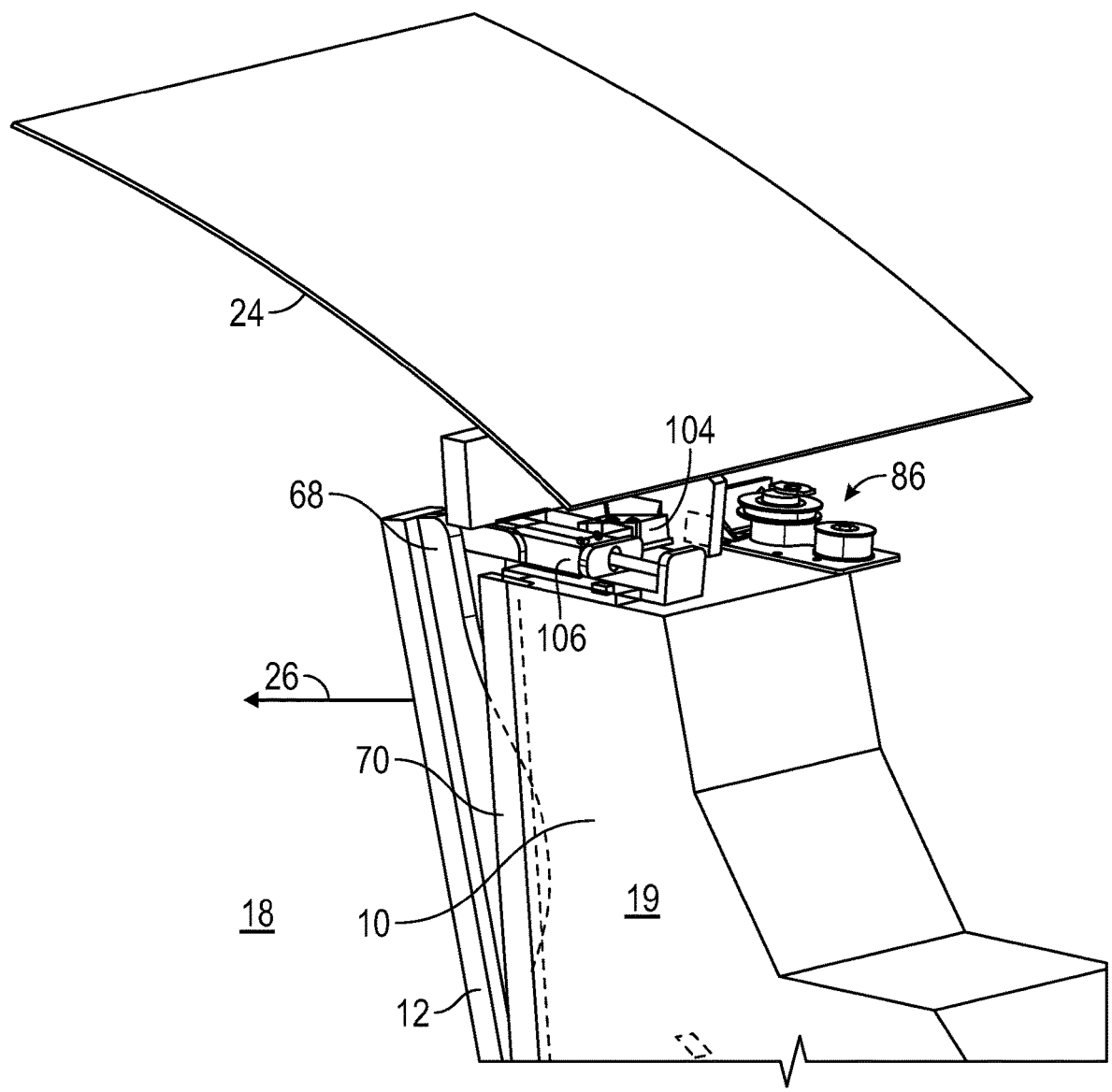
FIG. 5 illustrates a perspective rear view of a portion of a cabinet including a cabinet door that has been unlatched from a closed position in accordance with an exemplary embodiment.
Figure 6:
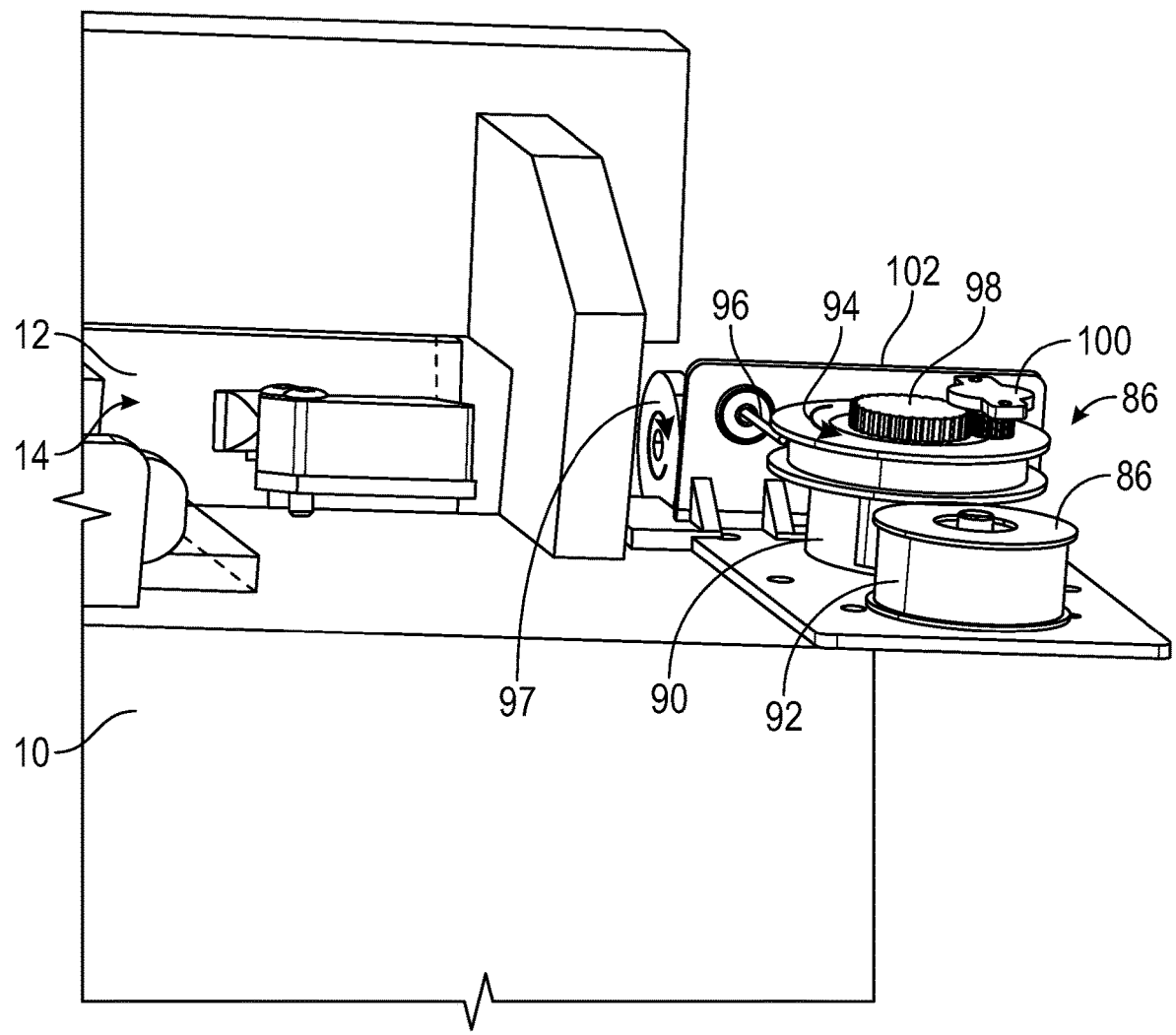
FIG. 6 illustrates a perspective rear view of a portion of a cabinet including a spring motor in accordance with an exemplary embodiment.
Figure 7:
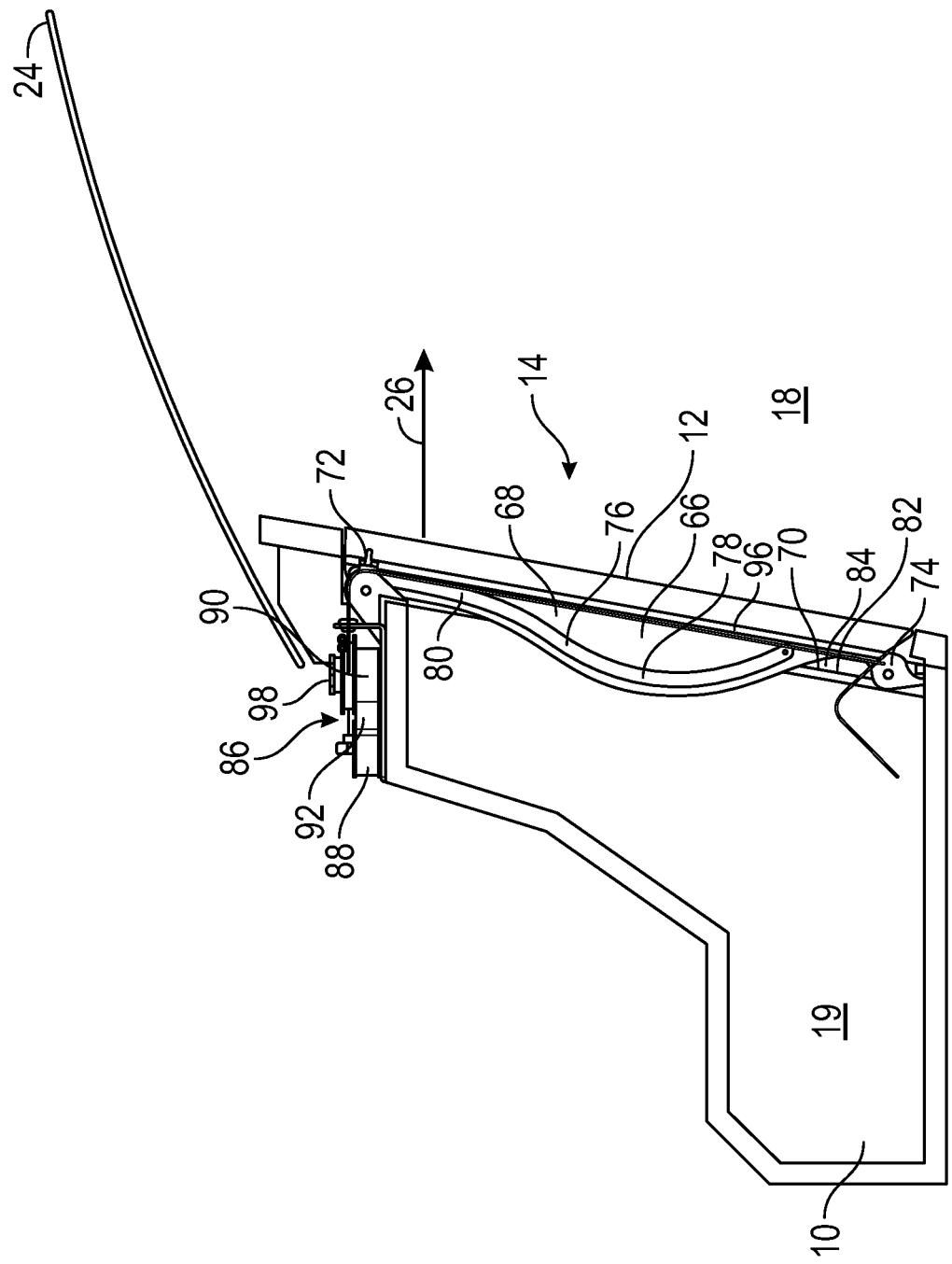
FIG. 7 illustrates a side view of a cabinet including a cabinet door in a closed position in accordance with an exemplary embodiment.
Figure 8:
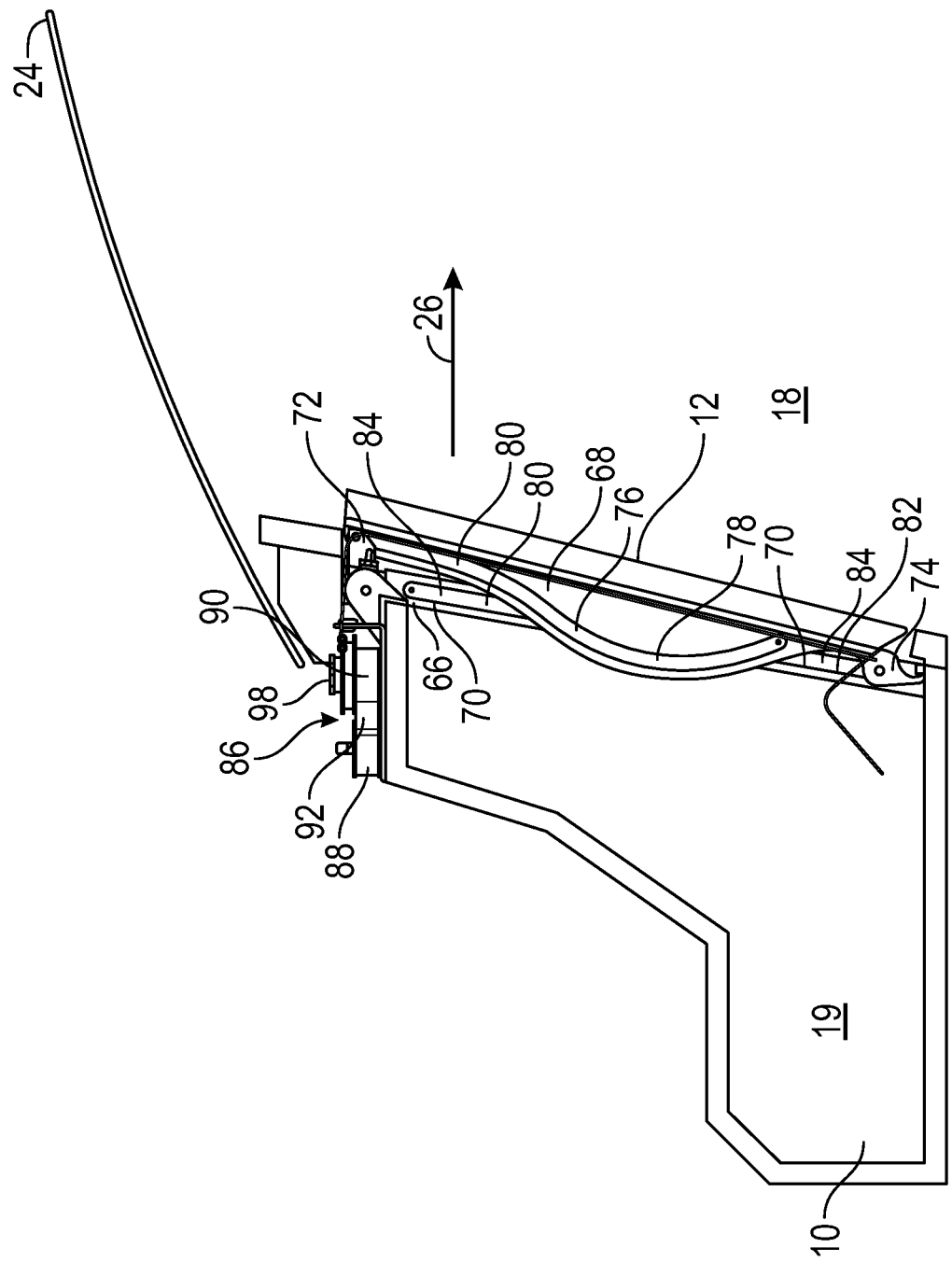
FIG. 8 illustrates a side view of a cabinet including a cabinet door that has been unlatched from a closed position in accordance with an exemplary embodiment.
Figure 9:
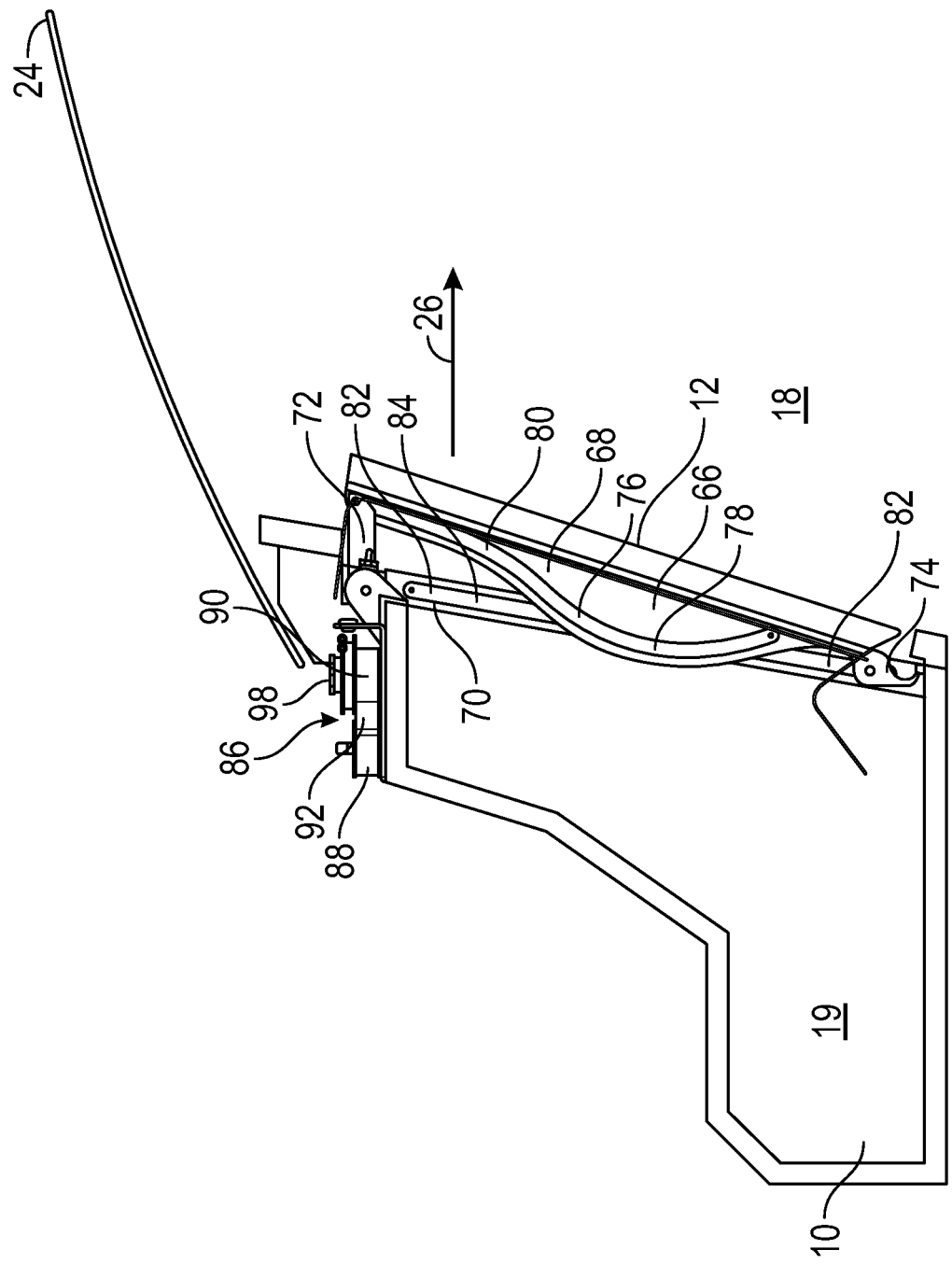
FIG. 9 illustrates a side view of a cabinet including a cabinet door in a partially open position in accordance with an exemplary embodiment.
Figure 10:
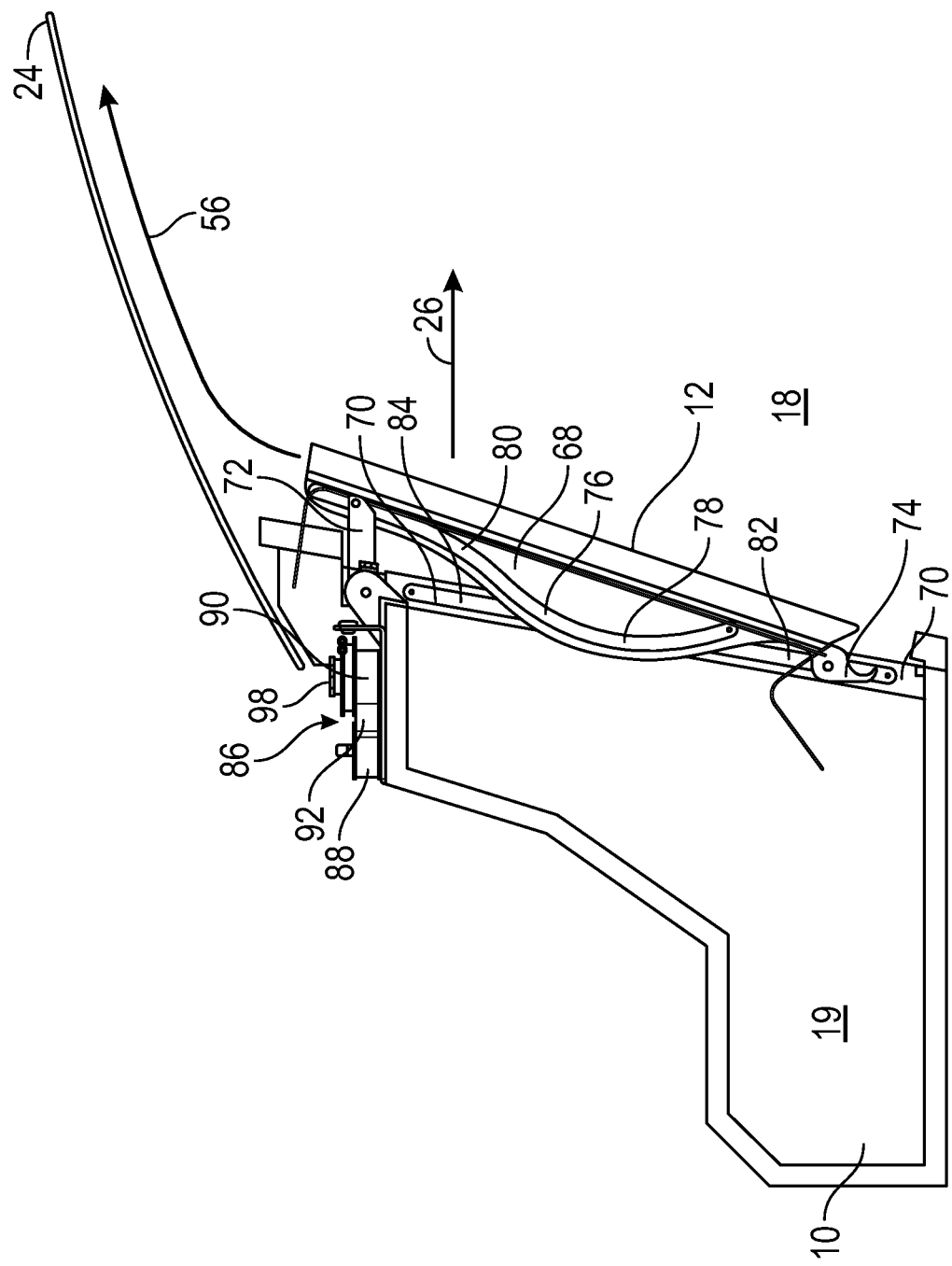
FIG. 10 illustrates a side view of a cabinet including a cabinet door in a further advanced partially open position in accordance with an exemplary embodiment.
Figure 11:
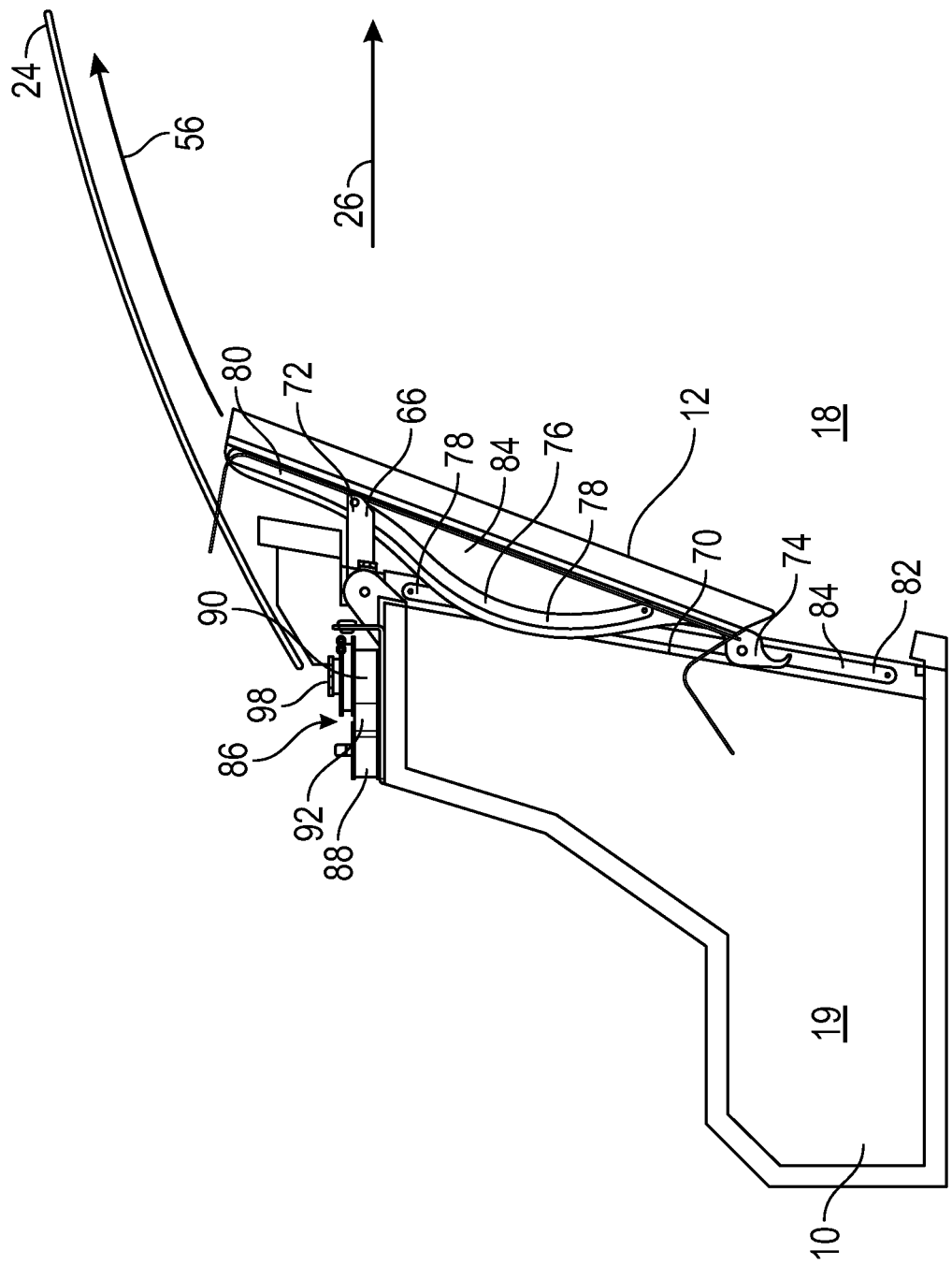
FIG. 11 illustrates a side view of a cabinet including a cabinet door in a further advanced partially open position in accordance with an exemplary embodiment.
Figure 12:
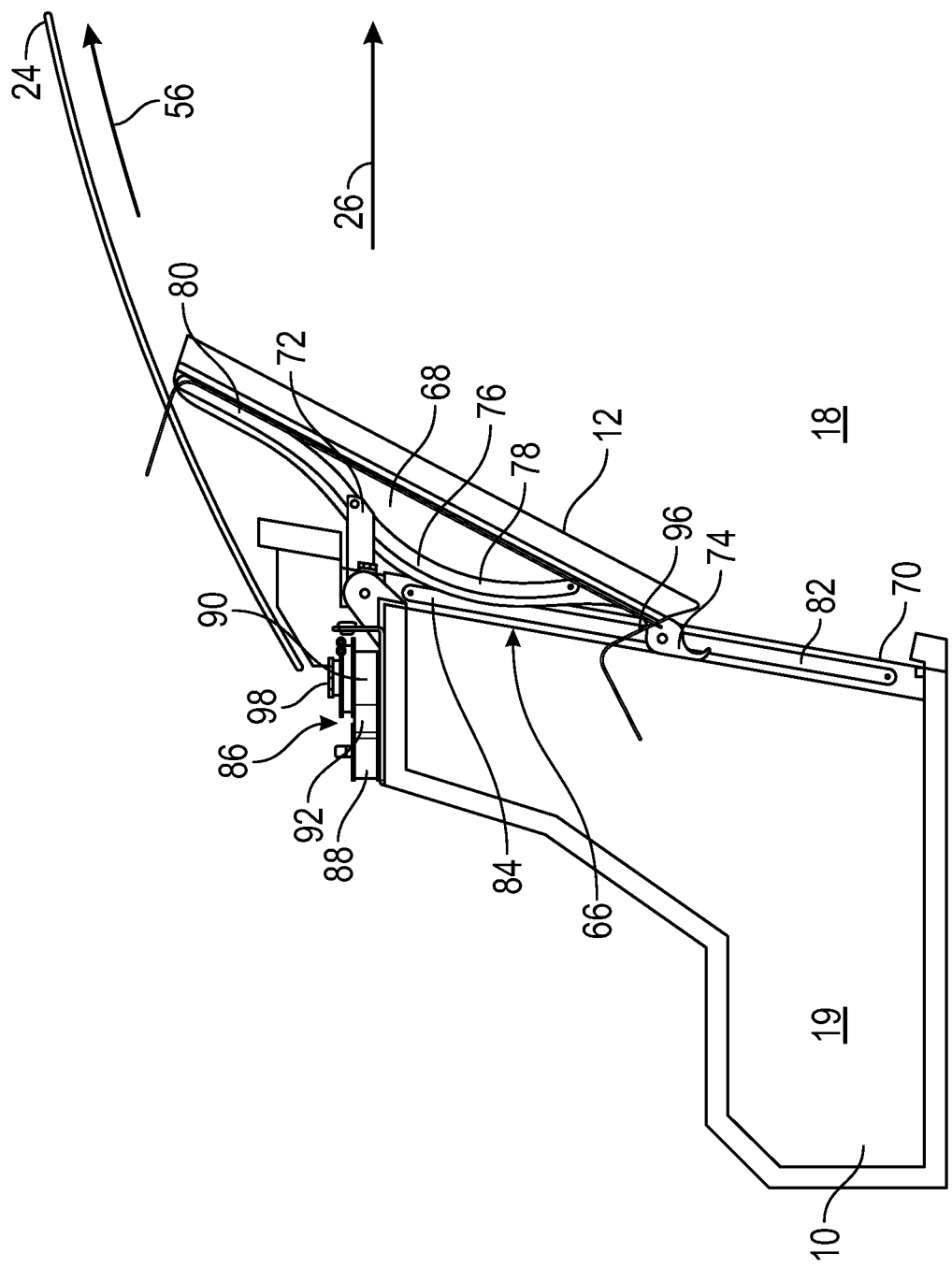
FIG. 12 illustrates a side view of a cabinet including a cabinet door in a further advanced partially open position in accordance with an exemplary embodiment.
Figure 13:
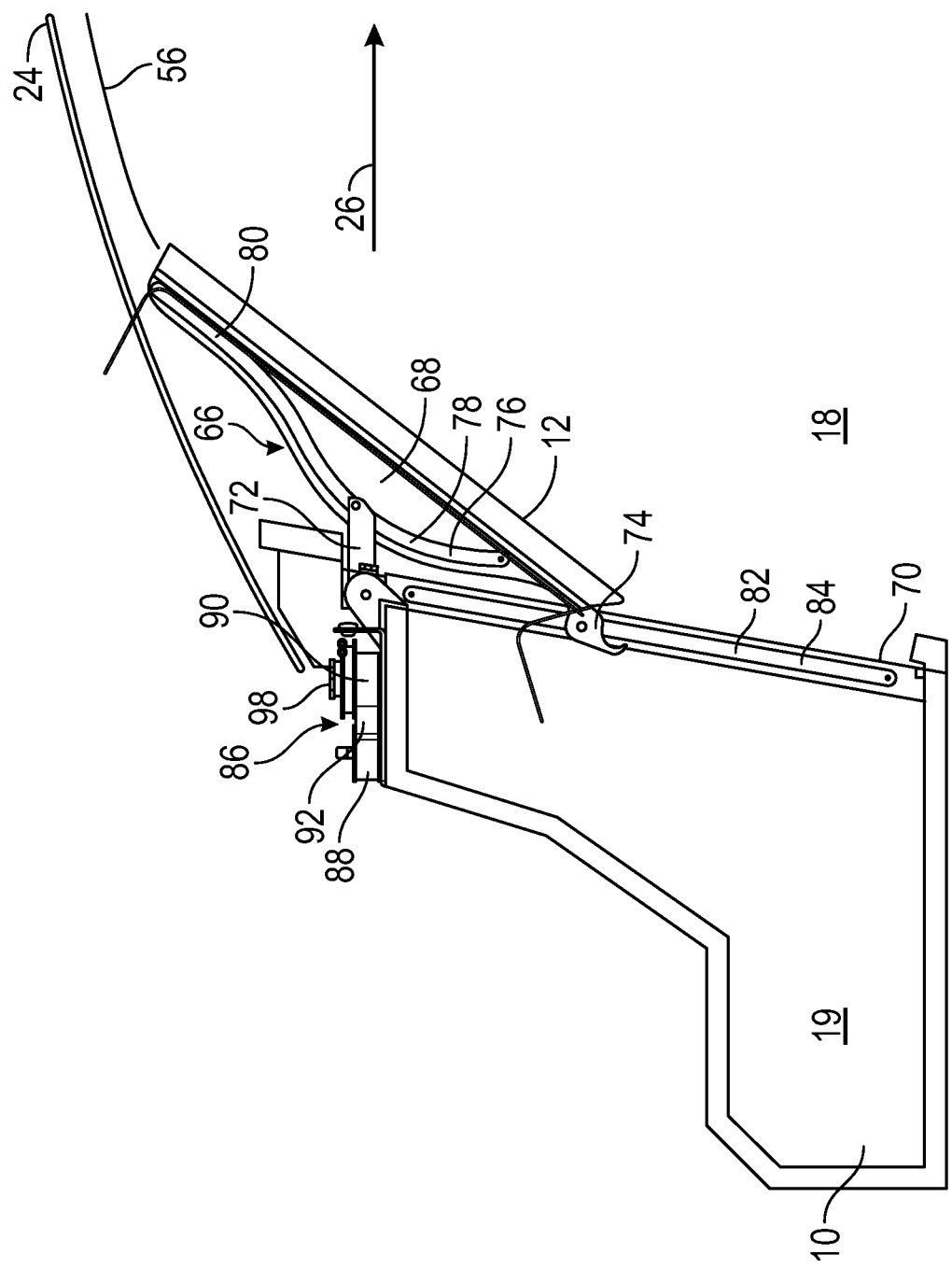
FIG. 13 illustrates a side view of a cabinet including a cabinet door in a further advanced partially open position in accordance with an exemplary embodiment.
Figure 14:
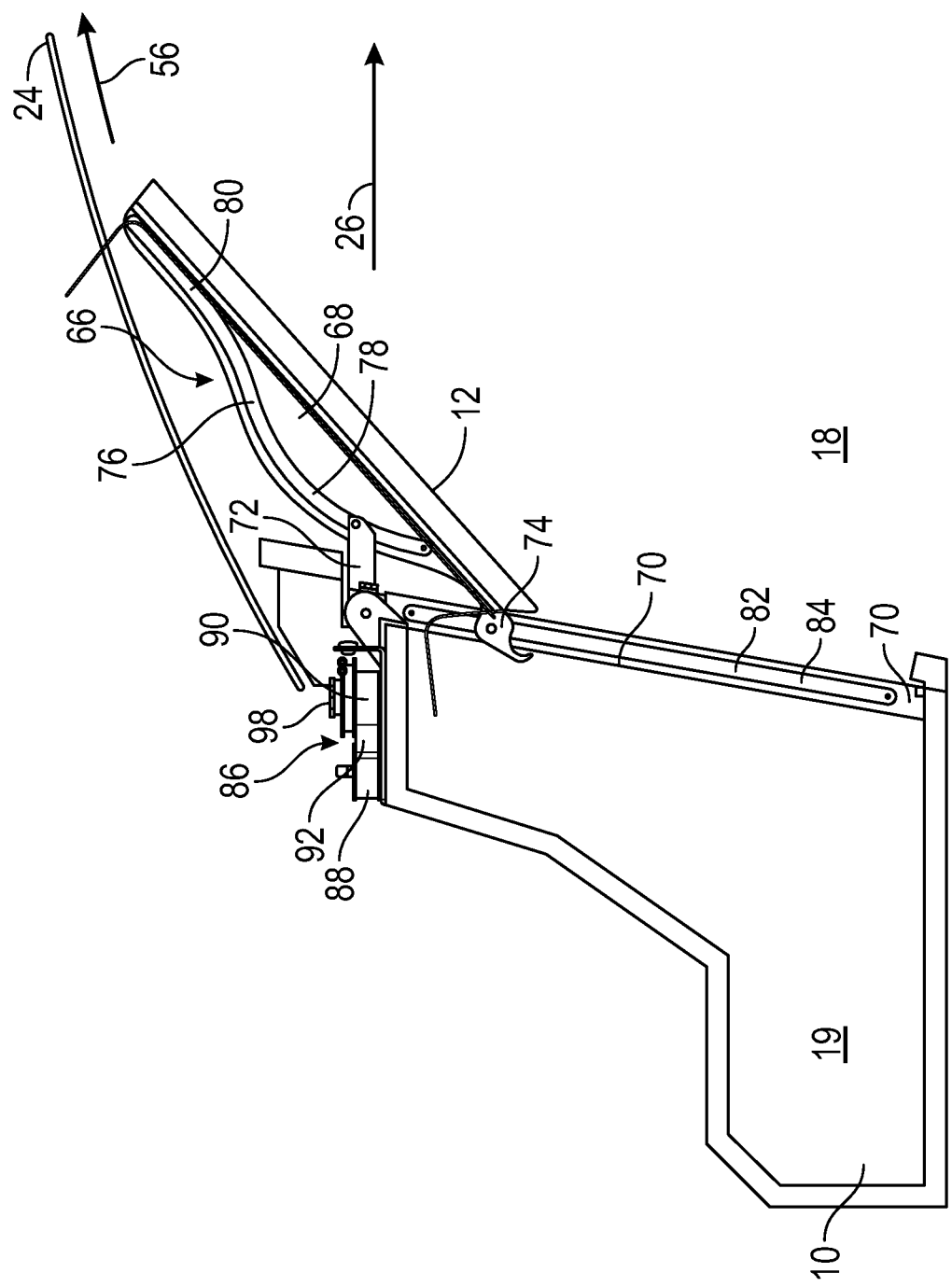
FIG. 14 illustrates a side view of a cabinet including a cabinet door in a further advanced partially open position in accordance with an exemplary embodiment.
Figure 15:
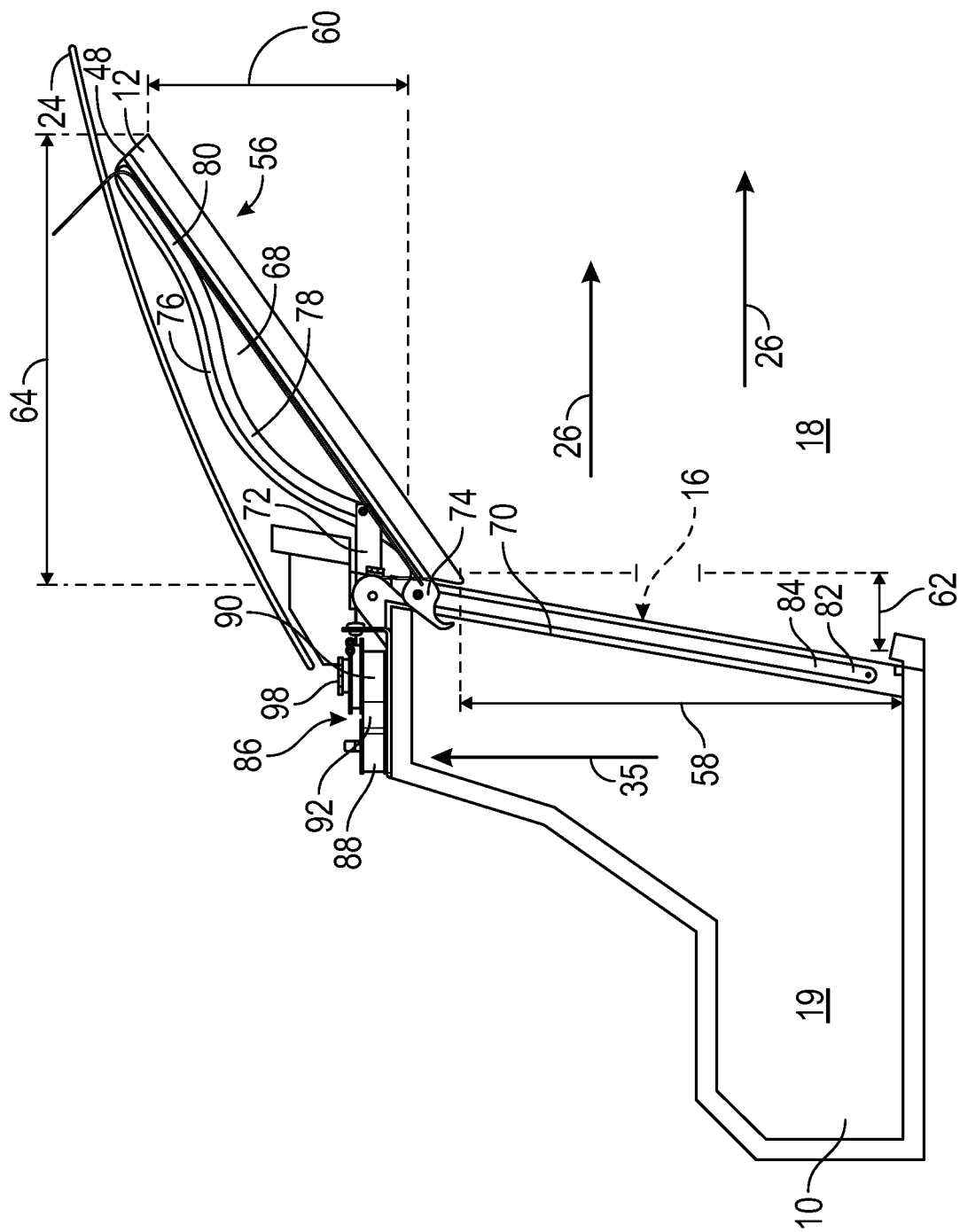
FIG. 15 illustrates a side view of a cabinet including a cabinet door in a fully open position in accordance with an exemplary embodiment.

In an exemplary embodiment, the cabinet 10 further includes a spring block 106 that is coupled to the upper portion of the cabinet body 19 adjacent to the latch 104 and that is selectively coupled to the cabinet door 12 proximate to the upper edge portion 48. When the cabinet door 12 is released by the latch 104, the spring block 106 is actuated to push against the back side 30 of the cabinet door 12 to further move the upper edge portion 48 of cabinet door 12 inboard in the direction 26 as shown in FIGS. 5 and 9. The spring motor 86 operates as discussed above to move the cabinet door 12 to the fully open position 54.

Figure 16:
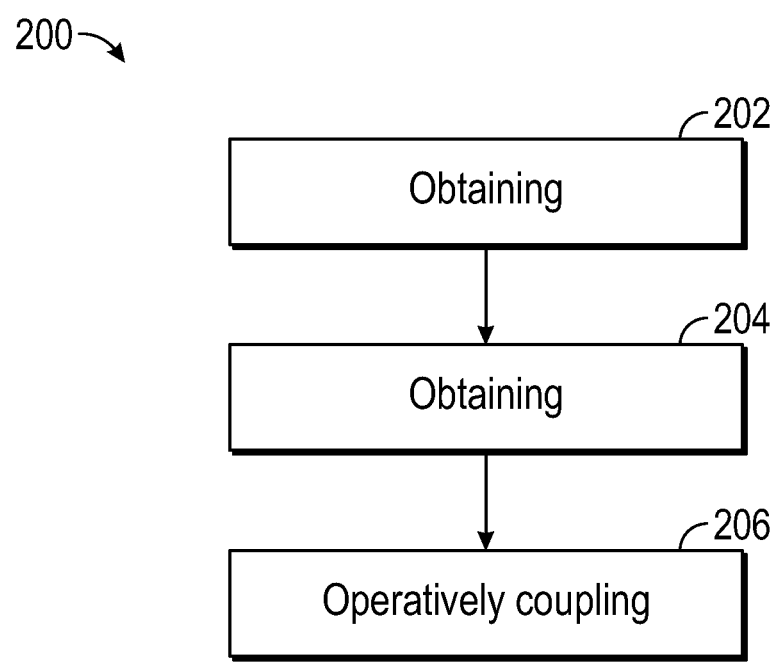
FIG. 16 illustrates a method for making a cabinet in accordance with an exemplary embodiment.

FIG. 16 illustrates a method 200 for making a cabinet in accordance with an exemplary embodiment. The method 200 includes obtaining (STEP 202) a cabinet body that at least partially surrounds a cabinet space and defines a cabinet opening that allows access to the cabinet space. For example, the cabinet body may be obtained by forming the cabinet body, procuring the cabinet body, and/or locating the cabinet body The method further.

A cabinet door is obtained (STEP 204) having an outer exposed surface. For example, the cabinet door may be obtained by forming the cabinet door, procuring the cabinet door, and/or locating the cabinet door. The cabinet door is configured to extend upward from a lower edge portion to an upper edge portion when in a closed position.

The cabinet door is operatively coupled (STEP 206) to the cabinet body such that the cabinet door at least partially covers the cabinet opening including the outer exposed surface facing generally in a first direction opposite or otherwise away from the cabinet space when in the closed position. The cabinet door opens from the closed position to an open position including the lower edge portion moving generally upward and the upper edge portion moving generally upward and towards the first direction to expose the cabinet opening.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A cabinet comprising:
    a cabinet body at least partially surrounding a cabinet space and defining a cabinet opening that allows access to the cabinet space;
    a cabinet door at least partially covering the cabinet opening when in a closed position and extending upward from a lower edge portion to an upper edge portion;
    a track-cam arrangement that slidingly couples the cabinet door to the cabinet body, wherein the cabinet door has an outer exposed surface facing generally in a first direction away from the cabinet space when in the closed position, and wherein the cabinet door is operatively coupled to the cabinet body for opening from the closed position to an open position including the lower edge portion moving generally upward and the upper edge portion moving generally upward and towards the first direction to expose the cabinet opening.

2. The cabinet of claim 1, wherein the cabinet door is operatively coupled to the cabinet body such that the lower edge portion moves generally upward a first total vertical distance and the upper edge portion moves generally upward a second total vertical distance that is less than the first total vertical distance when the cabinet door opens from the closed position to the open position.

3. The cabinet of claim 1, wherein the cabinet door is operatively coupled to the cabinet body such that the lower edge portion moves towards the first direction a first total horizontal distance and the upper edge portion moves towards the first direction a second total horizontal distance that is greater than the first total horizontal distance when the cabinet door opens from the closed position to the open position.

4. The cabinet of claim 1, wherein the track-cam arrangement comprises:
    a first track body portion coupled to the cabinet door and having a first track formed therein; and
    a first cam element coupled to the cabinet body and slidingly disposed in the first track, wherein the first track and the first cam element are cooperatively configured to guide the upper edge portion of the cabinet door generally upward and towards the first direction when the cabinet door opens from the closed position to the open position.

5. The cabinet of claim 4, wherein the first track includes a convex track section that curves outwardly in a direction opposite the outer exposed surface.

6. The cabinet of claim 5, wherein the first track further includes a substantially linear track section that extends from the convex track section generally towards the upper edge portion of the cabinet door.

7. The cabinet of claim 4, wherein the track-cam arrangement further comprises:
    a second track body portion coupled to the cabinet body and having a second track formed therein; and
    a second cam element coupled to the cabinet door and slidingly disposed in the second track, wherein the second track and the second cam element are cooperatively configured to guide the lower edge portion of the cabinet door generally upward when the cabinet door opens from the closed position to the open position.

8. The cabinet of claim 7, wherein the second track includes a substantially linear track section that extends generally upward.

9. The cabinet of claim 1, further comprising a spring motor coupled to the cabinet body and operatively coupled to the cabinet door to drive the cabinet door from the closed position to the open position.

10. The cabinet of claim 9, further comprising a cable that couples the spring motor to the cabinet door, and wherein the spring motor is configured to wind the cable to move the cabinet door from the closed position to the open position.

11. The cabinet of claim 10, further comprising:
    a damper gear coupled to the spring motor; and
    a damper that meshes with the damper gear to control a winding speed of the cable by the spring motor to dampen movement of the cabinet door from the closed position to the open position.

12. The cabinet of claim 1, further comprising a latch coupled to the cabinet body and selectively coupled to the cabinet door to hold the cabinet door in the closed position, and wherein the latch is configured to be actuated to release the cabinet door from the closed position.

13. The cabinet of claim 12, wherein the latch is selectively coupled to the cabinet door proximate the upper edge portion.

14. The cabinet of claim 12, further comprising a spring block that is coupled to the cabinet body and that is configured to apply a force to the cabinet door to push the upper edge portion in the first direction when the latch is actuated to release the cabinet door from the closed position.

15. An aircraft comprising:
    an aircraft structure having an interior;
    a cabinet disposed in the interior, the cabinet comprising:
        a cabinet body at least partially surrounding a cabinet space and defining a cabinet opening that allows access to the cabinet space; and
        a cabinet door at least partially covering the cabinet opening when in a closed position and extending upward from a lower edge portion to an upper edge portion, wherein the cabinet door has an outer exposed surface facing generally in a first direction towards the interior and away from the cabinet space when in the closed position, and wherein the cabinet door is operatively coupled to the cabinet body for opening from the closed position to an open position including the lower edge portion moving generally upward and the upper edge portion moving generally upward and towards the first direction to expose the cabinet opening.

16. The aircraft of claim 15, further comprising a headliner that extends from above the cabinet door in the closed position inboard towards a center region of the interior of the aircraft structure, and wherein the outer exposed surface of the cabinet door faces in the first direction inboard towards the center region of the interior.

17. The aircraft of claim 16, wherein the headliner has a curved outer surface that faces the interior of the aircraft, and wherein the upper edge portion of the cabinet door moves along a curved path that is proximate to and substantially matches the curved outer surface of the headliner.

18. A method for making a cabinet, the method comprising the steps of:
- obtaining a cabinet body that at least partially surrounds a cabinet space and defines a cabinet opening that allows access to the cabinet space;
- obtaining a cabinet door having an outer exposed surface and configured to extend upward from a lower edge portion to an upper edge portion when in a closed position; and
- operatively coupling the cabinet door to the cabinet body such that the cabinet door at least partially covers the cabinet opening including the outer exposed surface facing generally in a first direction away from the cabinet space when in the closed position and opens from the closed position to an open position including the lower edge portion moving generally upward and the upper edge portion moving generally upward and towards the first direction to expose the cabinet opening, wherein operatively coupling comprises slidingly coupling the cabinet door to the cabinet body via a track-cam arrangement.

\* \* \* \* \*